(12) United States Patent
Vargantwar et al.

(10) Patent No.: US 8,265,660 B1
(45) Date of Patent: Sep. 11, 2012

(54) INCOMING CALL PROCESSING FOR MOBILE STATIONS CURRENTLY IN AN ACCESS STATE OR PAGING STATE

(75) Inventors: Sachin Vargantwar, Overland Park, KS (US); Kamal Doshi, Overland Park, KS (US); Anoop Goyal, Overland Park, KS (US); Manoj Shetty, Overland Park, KS (US); Siddharth Oroskar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1112 days.

(21) Appl. No.: 11/904,797

(22) Filed: Sep. 28, 2007

(51) Int. Cl.
*H04W 68/00* (2009.01)

(52) U.S. Cl. .................. 455/458; 455/412.1; 455/412.2; 455/413; 455/417; 455/434; 455/435.2; 370/310; 370/310.2; 370/322; 379/93.24; 379/211.01

(58) Field of Classification Search ............... 455/412.1, 455/0.2, 413, 418, 434, 435.2, 458; 370/310, 370/310.2, 322; 379/93.24, 211.01
See application file for complete search history.

(56) References Cited

U.S. PATENT DOCUMENTS

| | | | |
|---|---|---|---|
| 5,604,748 A | | 2/1997 | Date et al. |
| 5,794,156 A | * | 8/1998 | Alanara ..................... 455/517 |
| 5,946,356 A | | 8/1999 | Felix et al. |
| 6,285,667 B1 | * | 9/2001 | Willars et al. ............... 370/329 |
| 6,317,607 B1 | * | 11/2001 | Tomcik et al. ............ 455/552.1 |
| 6,408,177 B1 | * | 6/2002 | Parikh et al. .............. 455/414.4 |
| 6,658,255 B1 | | 12/2003 | Goss et al. |
| 6,996,060 B1 | | 2/2006 | Dahlby et al. |
| 2004/0141479 A1 | | 7/2004 | Cha et al. |
| 2005/0107107 A1 | | 5/2005 | Shahidi et al. |

* cited by examiner

*Primary Examiner* — Steve D Agosta (57) ABSTRACT

Methods are described for handling an incoming call at a mobile switching center when the mobile station is currently in either an access state (in the process of making an outgoing call) or in a paging state (in the process of receiving an earlier incoming call). The mobile switching center waits until the mobile station transitions out of the access state or paging state into a traffic state. The mobile switching center sends an alert message to the mobile station alerting the user of the new incoming call. The mobile switching center handles the incoming call per a response to the alert message. One option would be to send the new incoming call to the user and drop the other incoming call (or the outgoing call). Another option would be to direct the incoming call to voice mail. In either case, the handling of the incoming call is per the user's direction, i.e., as dictated by the response message.

20 Claims, 5 Drawing Sheets

Fig. 1 — PAGING STATE SCENARIO

Fig. 2 — ACCESS STATE SCENARIO

ALERT WITH INFORMATION MESSAGE

18:14:47.961 FORWARD TRAFFIC CHANNEL:
ALERT WITH INFORMATION
ACK_SEQ:3    MSG_SEQ:1    ACK_REQ:1    ENCRYPTION: 0
SIGNAL_TYPE=IS-54B ALERTING
ALERT_PITCH=MEDIUM PITCH (STANDARD ALERT)
SIGNAL=LONG    RESERVED=0
RECORD_LEN=96 BITS
NUMBER_TYPE=NATIONAL NUMBER
NUMBER_PLAN=ISDN/TELEPHONY NUMBERING PLAN
PI=PRESENTATION ALLOWED    SI=NETWORK PROVIDED
CHARi=6153000124    RESERVED=0    RESERVED=0
...

INCOMING CALL PROCESSING FOR MOBILE STATIONS CURRENTLY IN AN ACCESS STATE OR PAGING STATE

BACKGROUND

The invention relates generally to the field of wireless telephony and more particularly to the process of handling an incoming call to a mobile station while the mobile station is currently in an access state or a paging state.

In the existing art, wireless telephone networks use a mobile switching center (MSC) to set up incoming and outgoing calls for mobile stations which are currently registered with the MSC. When an MSC sets up an incoming call to a mobile station, the mobile station briefly transitions to a "paging state", that is, a state in which a base transceiver station (BTS) in the wireless network is in the process of paging the mobile station and/or waiting for a page response message from the mobile station. Similarly, when a mobile station is seeking to gain access to the wireless network to place an outgoing call, a mobile station transitions briefly to an "access state", that is, a state in which it is exchanging set up messages with the BTS. The period of time during which the mobile station is in the paging state or in the access state may last from anywhere from 5 to 30 seconds, typically.

After being in the access state or the paging state, a mobile station transitions to what is known as a "traffic" state. In the traffic state, a traffic channel is set up between the mobile station and the BTS and a communication path between the MSC and the mobile station exists, allowing for communication between the mobile station and the other party to the call to occur via the MSC, BTS and air interface on the mobile station.

In the current state of the art, if a mobile station is in the access state and an incoming call for the mobile station arrives at the MSC, the MSC will simply send the new incoming call to the mobile station's voice mail. If the mobile station is in the paging state, the incoming caller will get a busy tone. The MSC will not notify the mobile station of the incoming call at the time, since there is no way to do so today while the mobile station is in the paging state or access state. In the case of two basically simultaneous incoming calls (a situation referred to herein as a "paging state scenario"), the mobile station is not aware that the second incoming call exists because it is already in the paging state as a result of the first incoming call. Thus, the user of the mobile station has no opportunity to decide which of the two essentially simultaneous incoming calls to take.

In the case of an incoming call arriving while the mobile station is already in the process of making a new outgoing call (a situation referred to herein as an "access state scenario"), the user of the mobile station will not know of the fact that this new incoming call has occurred because it will be sent to voice mail. The user will not have the opportunity to abort their outgoing call and take the new incoming call instead.

In either the paging state scenario or the access state scenario, had the user of the mobile station known that the other call was coming in, they may have preferred to take that call instead. Indeed, in some situations the fact that the incoming call was occurring and available to take, without going into voice mail, may be critically important to the user of the mobile station. In other situations, it may not be so critically important to the user of the mobile station to take the new incoming call and they may be content to have the call sent to their voice mail. Unfortunately, in the present state of the art, the user does not have the opportunity to make a decision about whether or not to take an incoming call while their phone is already in the access state or the paging state. Rather, they will only know of the existence of this call when they go to check their voice mail.

This invention is directed to methods of correcting this situation. The methods allow users of mobile stations to become aware of, and select, a new incoming call even after they have entered a paging state or an access state, thereby solving the above described problems.

SUMMARY

In a first aspect, this invention is directed to a method of processing an incoming call for a mobile station. The method is particularly directed to handling the situation where an incoming call arrives while a mobile station is currently in either the access state or paging state. The method includes the steps of receiving an incoming call for the mobile station at a mobile switching center and checking the current state of the mobile station. In the event that the mobile station is in an access state or paging state, the method continues with steps a)-d): a) waiting until the mobile station transitions to a traffic state, b) after the mobile station transitions to a traffic state, sending an alert message to the mobile station informing the mobile station of the incoming call, c) receiving a response to the alert message from the mobile station; and d) handling the incoming call in accordance with the response.

One example of how the call might be handled in step d) is sending the incoming call to voice mail. As another example, the handling in step d) could take the form of connecting the incoming call with the mobile station. In this latter example, the call processing that was occurring at the time the incoming call arrived may be aborted. As one example, the outgoing call that triggered the mobile station going into the access state is not completed. Alternatively, the other incoming call that triggered the mobile station being in the paging state is sent to voice mail. In either situation, the response that is sent to the mobile switching center in step c) indicates how the user of the mobile station wants to handle the incoming call—the original call that was in process (either an outgoing or incoming call), or the new incoming call.

To facilitate the advising of the user of the incoming call and enabling the user to exercise more control over the process, the alert message sent in step b) in one embodiment includes the telephone number of the caller of the incoming call. The mobile station includes a software process that extracts the telephone number from the alert message and displays it on the mobile station's display. Thus, the incoming caller's phone number can be displayed on the mobile station and therefore allow the user to make a judgment as to whether they want to take that call, send it to voice mail, or take some other action (e.g., have the MSC send a busy signal).

Thus, in one embodiment, in response to the receiving of the alert message, the mobile station presents a message on a display of the mobile station informing the user of the mobile station of the incoming call (and preferably the phone number or other identification associated with the call) and telling the user the steps to take in order to have the MSC handle the call in the desired fashion. For example, the message may say "press 1 to take the call, press 2 to send it to voice mail, press 3 to send a busy signal." The user then presses a button in accordance with how they want to handle the call. The response message received in step c) includes data indicating which button was pressed. The mobile switching center then processes the response message according to the user's instructions in step d).

The step of checking the current state of the mobile station may take the form of the mobile switching center checking a table that lists all mobile stations currently registered with the mobile switching center and the current state of such mobile stations. The table is preferably updated continuously, e.g., by an update process executing in the mobile switching center.

As noted above, the mobile switching center will perform a waiting process if the incoming call comes in while the mobile station is in the paging state or the access state. There are several variations of how this waiting process can be implemented.

In one form, the waiting process or step includes the sub-steps of (i) setting a timer having a timer value, (ii) waiting for the timer value to elapse, (iii) re-checking the state of the mobile station, and proceeding with the sending of the alert message (step (b)) if the mobile station has transitioned to the traffic state.

In one embodiment, if after sub-step (iii) the mobile station has not transitioned to the traffic state, sub-steps (i), (ii) and (iii) are repeated. Alternatively, in the event after the sub-step (iii) the mobile station has not transitioned to the traffic state, the mobile switching center can send the incoming call to voice mail, or take some other action, such as sending a busy signal to the caller's phone.

In the embodiment where the waiting step includes the use of a timer, in one embodiment the timer value has a first value (e.g., 20 or 30 seconds) if the mobile station is in the paging state and the timer value has a second value (e.g., 5 or 15 seconds) if the mobile station is in the access state. While the timer values could in theory take any reasonable value, in the illustrated embodiments both of the timer values are 30 seconds or less. If timer values exceed 30 seconds, the calling party may be at risk of hanging up since most callers will only wait a finite period of time while the call connection process is ongoing before becoming impatient and thus hanging up. Therefore, timer values of less than 30 seconds are preferred. It would be possible to increase these values to greater than 30 seconds if for example the mobile switching center sent a message to the calling phone indicating that the call connection process might take longer and suggesting the caller wait a little longer.

In another aspect, an improvement to a mobile switching center is disclosed. The improvement takes the form of providing a memory maintaining state information as to whether mobile stations are currently in an access state or a paging state; and providing instructions in the mobile switching center whereby in the event that an incoming call for a mobile station occurs while the mobile station is in either the access state or a paging state the mobile switching center performs a waiting step and waits until the mobile station transitions to a traffic state. After the transition occurs, the mobile switching center sends an alert message to the mobile station alerting the mobile station of the incoming call. This aspect of the invention may use one or more of the timer features as described herein.

In another aspect, a mobile switching center is disclosed having a memory storing instructions for a processing unit in the mobile switching center. An improvement is provided for the mobile switching center, the improvement comprising providing in the memory the following machine-readable instructions: (a) instructions for generating an alert message containing a telephone number of an incoming call for a mobile station; (b) instructions for sending the alert message to the mobile station after the mobile station has been in a paging state or an access state and has transitioned to a traffic state; and (c) instructions for processing the incoming call pursuant to a response to the alert message received at the mobile switching center from the mobile station. One option for the processing is the option of sending the incoming call to the mobile station.

DETAILED DESCRIPTION

Paging State Scenario Process

Figure 1:
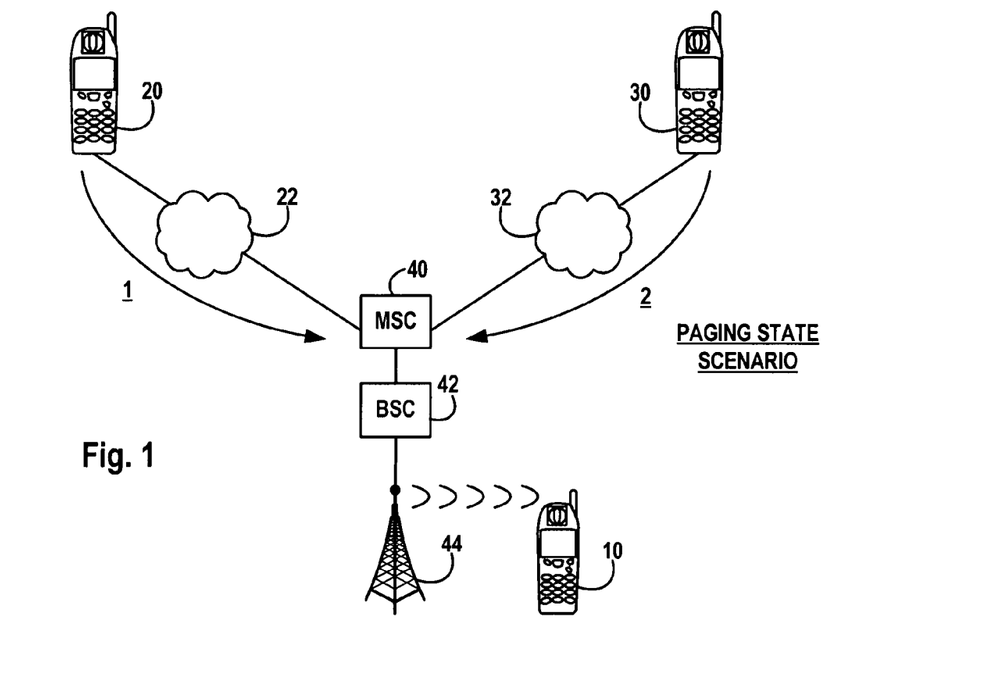
FIG. 1 is a block diagram of a wireless network showing a paging state scenario where an incoming call for a mobile station arrives at an MSC while the MSC is already paging the mobile station due to an earlier incoming call. The mobile station 10 is in the paging state when the second incoming call arrives at the MSC.

FIG. 1 is a block diagram of a telephone network showing a paging state scenario where an incoming call for a mobile station 10 originating from telephone 30 arrives at an MSC 40 while the MSC 40 is already paging the mobile station 10 due to an earlier incoming call originating from mobile station 20. When the incoming call from telephone 20 arrives at the MSC 40 via telephone network 22, the MSC 44 sends a page message to a base station controller 42 and base transceiver station (BTS) 44 instructing the BTS 44 to page the mobile station 10. The call from phone 20 is the first incoming call, and is described as "call 1" and represented by the arrow 1 in FIG. 1. Thus, the mobile station 10 is already in the paging state when the second incoming call from phone 30 arrives at the MSC 40 via the telephone network 32. The call from telephone 30 is the second call and thus is referred to as "call 2" and represented by the arrow 2 in FIG. 1.

In the prior art, the caller of call 2 would receive a busy signal and the user of the mobile station 10 would not know about this existence of this call at the time they were being paged due to call 1.

However, in this invention the user of the mobile station 10 will know that the call 2 arrived even though the mobile station 10 has already transitioned to the paging state due to call 1 occurring first, and be able to take call 2 if desired instead of call 1.

This is achieved in the following manner. When the MSC 40 receives the call 2, the mobile switching center 40 will determine the current state of the mobile station 10 (whether it is in the access state, paging state, idle state, or traffic state). If the mobile station 10 is in the paging state, which will be the case here, the MSC 40 will wait until the mobile station 10 transitions to a traffic state. After the mobile station transitions to a traffic state, the MSC sends an alert message (FIG. 6) to the mobile station informing the mobile station 10 of the second incoming call 2. The mobile station will display an appropriate prompt on the display and give the user of the mobile station to the opportunity to dictate how it wishes to handle calls 1 and 2. The mobile station then generates a response message containing data representing the user instructions (e.g., a DTMF tone indicating a particular button was pushed). The response message to the alert message is received at the MSC 40. The MSC 40 then acts on call 2 in accordance with the response, e.g., but putting it through to the mobile station on the traffic channel that was established, or sending it to voice mail.

Access State Scenario Process

Figure 2:
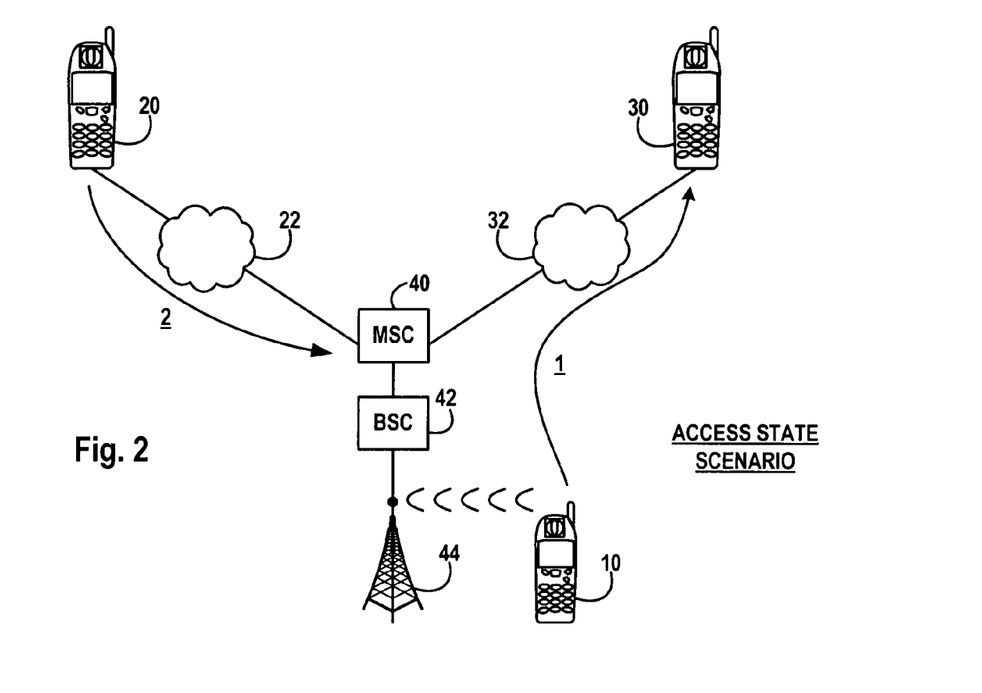
FIG. 2 is a block diagram of a wireless network showing an access state scenario where an incoming call for a mobile station arrives at an MSC while the mobile station is in the process of placing a call to another telephone. The mobile station 10 is in the access state when the incoming call arrives at the MSC.

FIG. 2 is a block diagram of a wireless network showing an access state scenario where an incoming call for a mobile station 10 originating from telephone 20 arrives at an MSC 40 while the mobile station 10 is already in the process of placing an outgoing call to another telephone 30. The mobile station 10 is in the access state when the incoming call from telephone 20 arrives at the MSC 40. Since the outgoing call from mobile station 10 to the telephone 30 occurred first in time it is referred to as "call 1" and shown by the arrow 1 in FIG. 2. The incoming call from telephone 20 arrived after the mobile station 10 had already transitioned to the access state and thus is referred to as "call 2" and shown by the arrow 2 in FIG. 2.

In the prior art, call 2 would simply be sent to voice mail and the user of the phone 10 would not know about this existence of call 2 until they later checked for voice mail messages, since call 2 arrived while the mobile station had already transitioned to the access state due the earlier initiation of call 1 to mobile station 30.

However, in this invention the user of the mobile station will know that call 2 arrived at the MSC even though the mobile station 10 has already transitioned to the access state. Further, the user of the mobile station will be able to take the call 2 if desired instead of continuing on with outgoing call 1.

This is achieved in the following manner. When the MSC 40 receives the new incoming call 2, the mobile switching center 40 will determine the current state of the mobile station 10 (whether it is in the access state, paging state, idle state, or traffic state). If the mobile station 10 is in the access state, the MSC 40 will wait until the mobile station 10 transitions to a traffic state. After the mobile station 10 transitions to a traffic state, the MSC sends an alert message (FIG. 6) to the mobile station informing the mobile station 10 of the incoming call 2. The mobile station will display an appropriate prompt on the display and give the user of the mobile station the opportunity to dictate how it wishes to handle call 2. The mobile station then generates a response message containing data representing the user's instructions (e.g., a DTMF tone indicating a particular button was pushed), and the response to the alert message is received at the MSC 40. The MSC 40 then acts on call 2 in accordance with the response, e.g., but putting it through to the mobile station on the traffic channel that was established, or sending it to voice mail. In the event that the user indicates that it wishes to take call 2 instead of continuing with the placement of the call 1 to telephone 30, the processing of the call to telephone 30 is aborted.

Note in FIGS. 1 and 2 that the telephones 20 and 30 need not be wireless phones, as shown in FIG. 1. They could be conventional land line phones. Telephones 20 and 30 could also be a computing device for sending or receiving an SMS message, or any other communications device which has the capability to send or receive a message which requires paging the mobile station 10 by the MSC 40 and the BTS 44 or the mobile station entering into an access state in order to initiate communication with the device.

Figure 3:
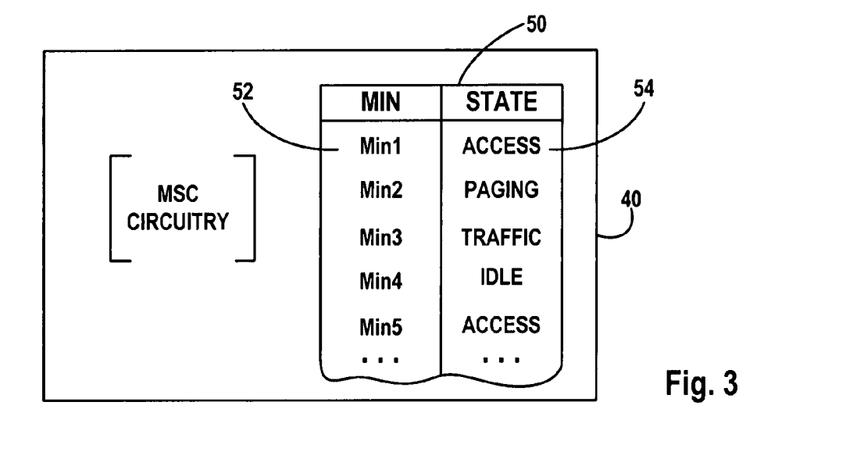
FIG. 3 is an illustration of an MSC showing a table containing state information for mobile stations currently registered with the MSC.

FIG. 3 is a simplified illustration of the MSC 40. The MSC 40 includes conventional MSC circuitry (e.g., processors and other components and a memory storing software instructions), which is conventional and therefore omitted. The MSC further includes a client process which maintains a table 50 containing current state information for mobile stations currently registered with the MSC 40. The table 50 includes a first column 52 which lists the Mobile Identification Numbers (MIN) for the currently registered mobile stations. MIN numbers are 10 digit numbers which a wireless system operator uses to uniquely identify mobile stations. The second column 54 indicates the current state of each mobile station. As shown in the table, the mobile with the MIN number min1 (some 10 digit number) is in the access state. The mobile with MIN number min2 is in the paging state, etc. The table 50 can be created and maintained in any suitable fashion, a detail which is within the ability of persons skilled in the art.

The MSC further includes a memory (not shown) containing software instructions for execution by a processing element in the MSC which implements the functions and methods as explained in this disclosure, including the processing shown in FIG. 4 and described below and the instructions (e.g., client application) maintaining the table 50 of FIG. 3.

In particular, the MSC stores in memory instructions maintaining state information as to whether mobile stations are currently in an access state or a paging state (FIG. 3); and instructions whereby in the event that an incoming call for a mobile station occurs while the mobile station is in either the access state or a paging state the mobile switching center performs a waiting step and waits until the mobile station transitions to a traffic state, thereafter the mobile switching center sends an alert message to the mobile station alerting the mobile station of the incoming call.

The MSC further includes instructions generating an alert message (FIG. 6) containing a telephone number (field 302) of an incoming call for a mobile station; instructions for sending the alert message to the mobile station 10 after the mobile station 10 has been in a paging state or an access state and has transitioned to a traffic state; and instructions for processing the incoming call pursuant to a response to the alert message received at the mobile switching center from the mobile station. As explained herein, one option for the processing is the option of sending the incoming call to the mobile station.

MSC Handing the Wait Process Until Mobile Station Transitions to Traffic State

As noted in the above discussion of FIGS. 1 and 2, if the MSC receives an incoming call for a mobile station while the mobile station is already in the paging state or the access state, the MSC 40 performs a waiting step. There are several variations of how this waiting process can be implemented, e.g. by software instructions in the MSC 40.

In one embodiment, the waiting process or step includes the sub-steps of (i) setting a timer having a timer value, (ii) waiting for the timer value to elapse, (iii) re-checking the state of the mobile station, and proceeding with the sending of the alert message (step (b)) if the mobile station has transitioned to the traffic state. Thus, in this embodiment MSC 40 can use a conventional timer circuit or buffer which is used for sub-steps (i) and (ii).

In one embodiment, if after sub-step (iii) the mobile station has not transitioned to the traffic state, sub-steps (i), (ii) and (iii) are repeated. Alternatively, in the event after step (iii) the mobile station has not transitioned to the traffic state, the mobile switching center can send the incoming call to voice mail, or take some other action, such as sending a busy signal to the caller's phone.

In the embodiment where the waiting step includes the use of a timer, in one embodiment the timer value has a first value (e.g., 20 or 30 seconds) if the mobile station is in the paging state and the timer value has a second value (e.g., 5 or 15 seconds) if the mobile station is in the access state. While the timer values could in theory take any reasonable value, in the illustrated embodiments both of the timer values are 30 seconds or less. If timer values exceed 30 seconds, the calling party may be at risk of hanging up since most callers will only wait a finite period of time while the call connection process is ongoing before becoming impatient and thus hanging up. Therefore, timer values of less than 30 seconds are preferred. It would be possible to increase these values to greater than 30 seconds if, for example, the mobile switching center sent a message to the calling phone indicating that the call connection process might take longer and suggesting the caller wait a little longer.

MSC Processing

Figure 4:
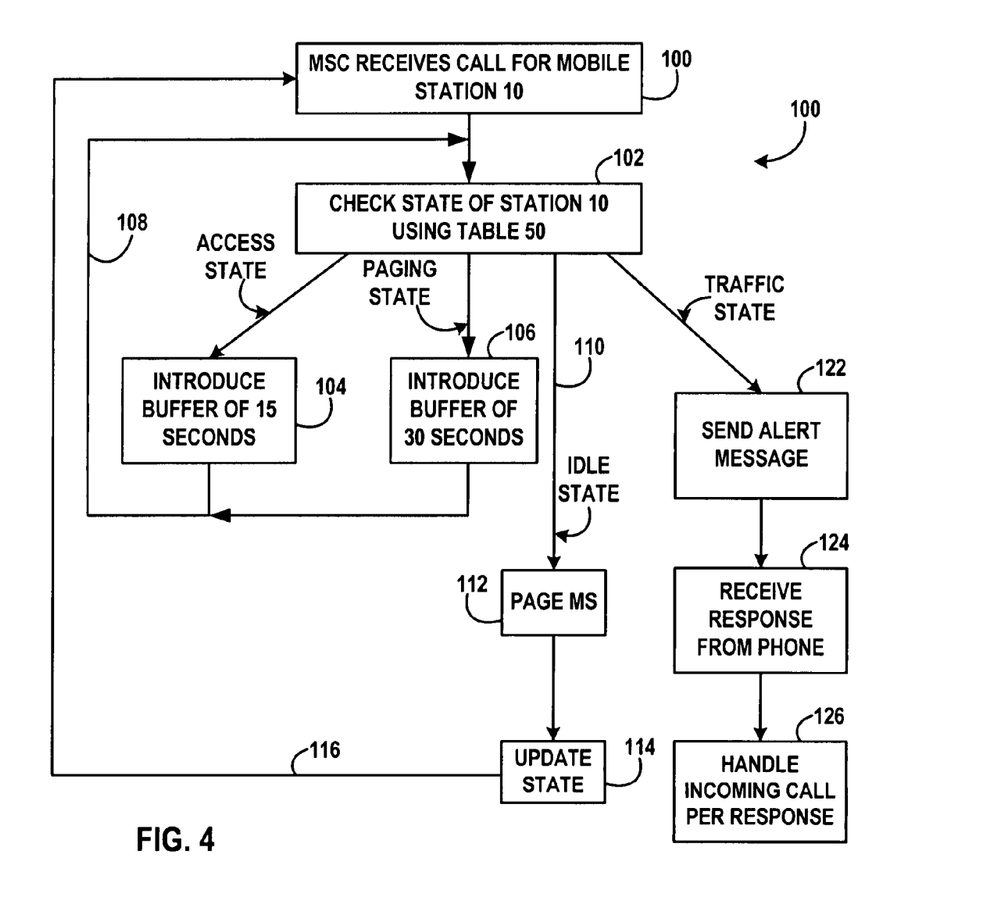
FIG. 4 is a flow chart showing a process executing in the MSC by which it uses the table of FIG. 3 to determine how to handle the new incoming call.

FIG. 4 is a flow chart showing one embodiment of a process 100 executing in the MSC 40 by which it uses the table 50 of FIG. 3 to determine how to handle a new incoming call when the mobile station is already in the access state or paging state.

As indicated at 100, the MSC 40 receives an incoming call for a mobile station which is currently registered with the MSC.

At step 102, the MSC checks the state of the mobile station using the table 50 of FIG. 3. This step will normally take five seconds or less.

If, at step 102, the mobile station is currently in the access state, the processing proceeds to step 104, in which the MSC introduces a waiting buffer of 15 seconds. After 15 seconds elapses, the processing then reverts back via branch 108 to the check state step 102.

If, at step 102, the mobile station is currently in the paging state, the processing proceeds to step 106, in which the MSC introduces a waiting buffer of 30 seconds. After 30 seconds elapses, the processing reverts back to the check state step 102.

If, at step 102, the mobile station is currently in an idle state, the processing proceeds along branch 110 to a step 112 in which the mobile station is paged. At step 114, the table 50 (FIG. 3) is updated to reflect the transition to the paging state, and the process loops back as indicated by the arrow 116.

Figure 6:
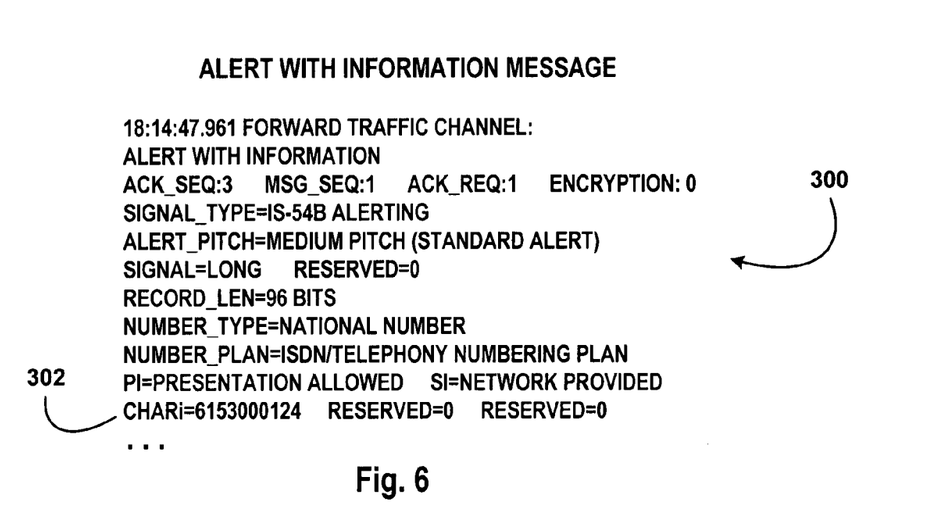
FIG. 6 is an illustration of an example of the alert message of FIG. 4 or 5.

If, at step 102 the mobile station has transitioned to the traffic state, the processing proceeds along branch 120 and at step 122 the MSC will generate an Alert message (FIG. 6). At step 124, the MSC will receive a response to the alert message from the mobile station. The response message will include data (e.g., DTMF tone) which indicates how the MSC is to handle the incoming call received at step 100. At step 126, the MSC handles the incoming call in the manner instructed in the response message. For example, the call can be sent to voice mail or sent through to the mobile station.

It will be appreciated that the processing shown in FIG. 3 may be performed for a multitude of incoming calls directed to mobile stations registered with the mobile switching center.

Call Flow

Figure 5:
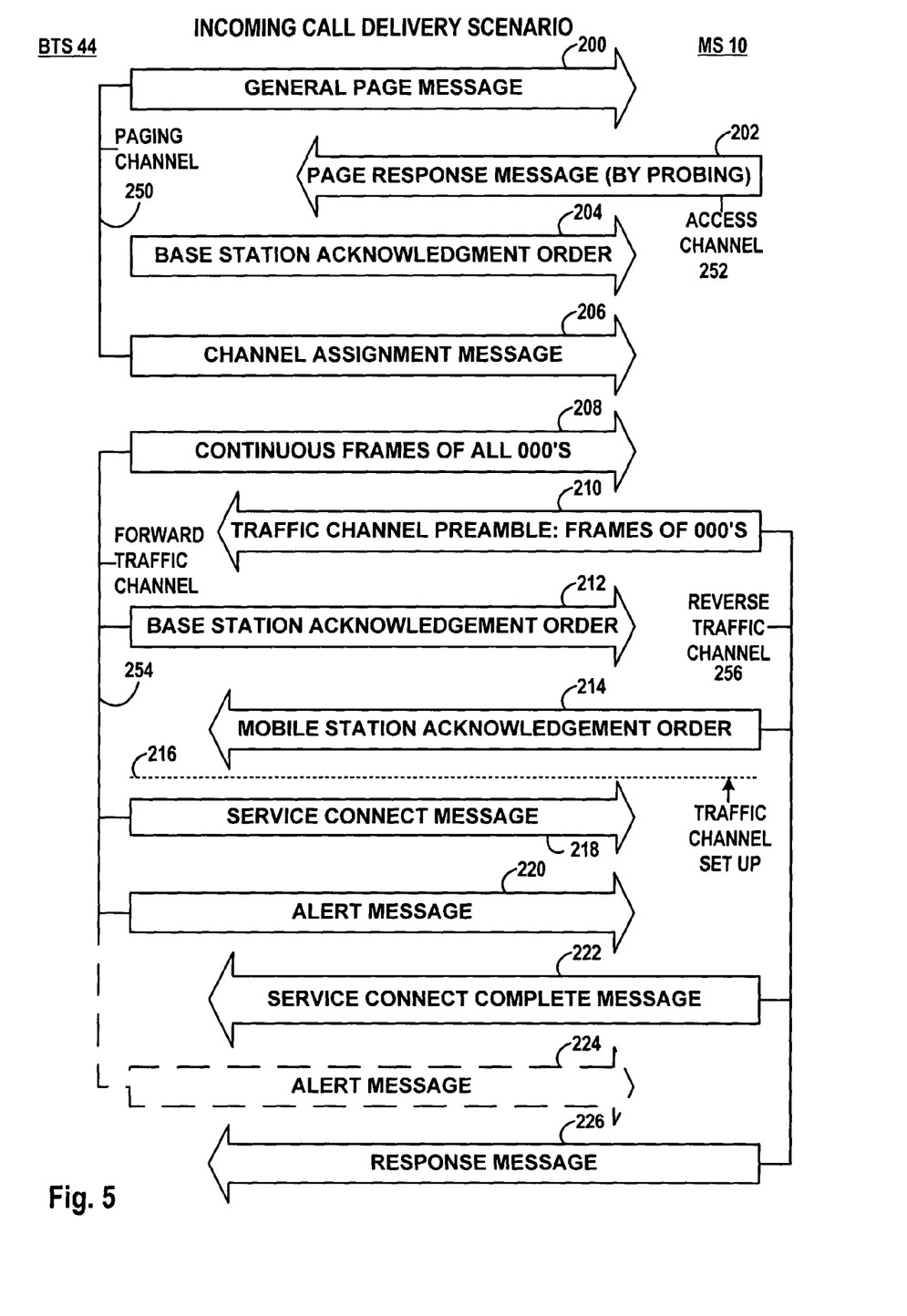
FIG. 5 is a call flow diagram showing the exchange of messages between a base transceiver station and a mobile station during an incoming call set-up.

FIG. 5 is a call flow diagram showing the exchange of messages between a base transceiver station 44 and a mobile station 10 during an incoming call set-up, showing how the alert message can be sent after the mobile station transitions to the traffic state.

The call flow diagram of FIG. 5 is particularly pertinent to the discussion of the paging state scenario, FIG. 1.

When the first call 1 (FIG. 1) from mobile station 20 arrives at the MSC 40, the BTS 44 generates and sends a general page message 200 which is sent over a paging channel 250 to the mobile station 10. The mobile station 10 sends a page response message 202 over an access channel back to the BTS 44. The BTS then sends a base station acknowledgement order message 204 and a channel assignment message 206 over the paging channel 250 back to the mobile station 10. The BTS then sends continuous frames of all 000's (208) to the mobile station on the forward traffic channel 254. The Mobile Station sends frames of 000's (210) on the reverse traffic channel 256. The BTS 44 sends an acknowledgement order message 212 on the forward traffic channel 254, and the mobile station sends an acknowledgement order message 214 on the reverse traffic channel 256. All the messaging 200, 202, 204, 206, 208, 210, 212 and 214 is messaging that occurs during the paging state, and while these messages are being exchanged the table 50 of FIG. 3 will show the mobile station 10 as being in the paging state. After the message 214 is sent, the traffic channel is set up as indicated by the line 216 and the mobile station is said to have transitioned to the traffic state. The state of the mobile station in the table 50 of FIG. 3 will then be changed to reflect that it is now in the traffic state.

The BTS 44 sends a service connect message 218 to the mobile station 10. The BTS 44 then sends the Alert message as indicated at 220, informing the mobile station of the occurrence of the second incoming call from telephone 30 (FIG. 1). The mobile station sends a service connect complete message 222. The service connect complete message could include the response to the alert message, or this response could be sent later, as indicated at 226. Also, the alert message could be sent after the service connect complete message as indicated at 224.

Alert Message

FIG. 6 is an illustration of an example of the alert message 300 which is sent as indicated at step 122 of FIG. 4 and at 220 or 224 of FIG. 5. The alert message need not be in any particular form and can be an extension or modification of an alert message which is defined by existing telecommunications standards.

In the paging state scenario, the alert message will preferably contain a field 302 containing the telephone number of the second incoming caller 30 (FIG. 1) and optionally the telephone number of both the second incoming caller 30 and the first incoming caller 20 (FIG. 1). The phone number for the first incoming caller may have already been provided to the mobile station, e.g., in the service connect message 218 of FIG. 4, in which case the alert message 300 of FIG. 6 need only contain the telephone number of the second incoming caller in field 302.

In the access state scenario, the alert message will typically only contain the phone number of the incoming caller (phone 20 in FIG. 2).

Mobile Station Response to Alert Message

When the alert message of FIG. 6 is sent to the mobile station 10, as indicated at step 122 of FIG. 4, the mobile station uses the information in the alert message, and in particular the phone number in field 302, to prepare a prompt on the mobile station user interface that facilitates letting the user provide instructions to the MSC on how it wishes to handle the incoming call. Several examples of such prompts will be explained now in conjunction with FIGS. 7 and 8.

Figure 7:
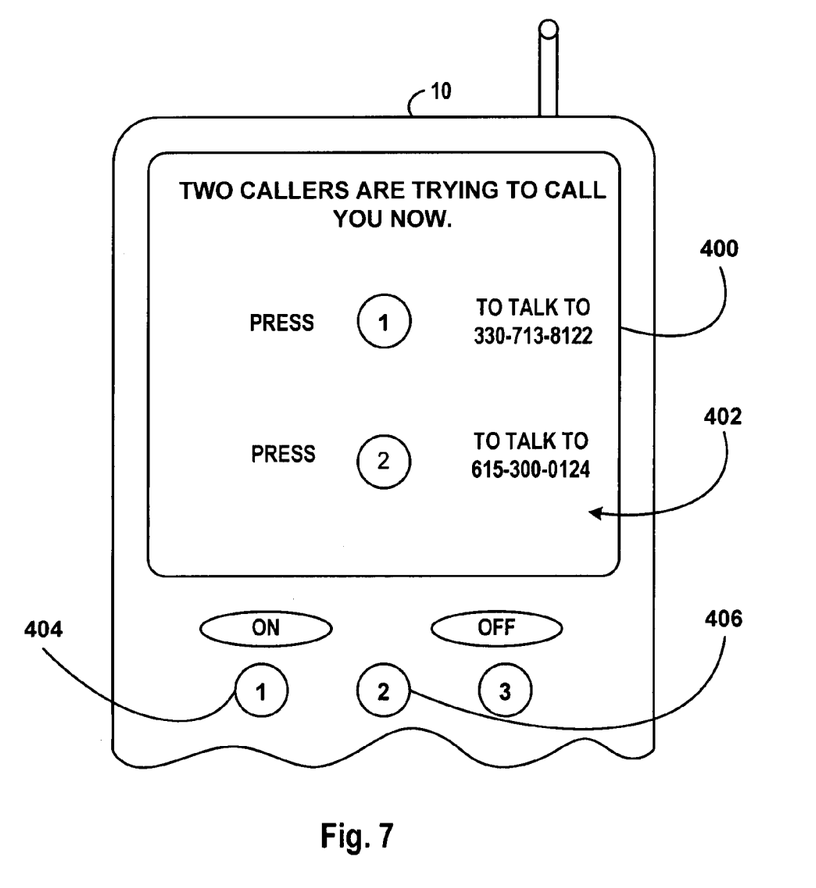
FIG. 7 is an illustration of a message displayed on a screen of the mobile station after it has received an alert message such as shown in FIG. 6 in the paging state scenario, giving the user of the mobile station the option to accept either of two incoming calls.

FIG. 7 is an illustration of a message 402 displayed on a screen 400 of the mobile station 10 after it has received an alert message 300 such as shown in FIG. 6 in the paging state scenario (FIG. 1). The message 402 gives the user of the mobile station 10 the option to accept either of the two incoming calls. For example the message 402 may state something to the effect of "two callers are trying to call your now, press 1 to talk to 330-713-8122 [call 1, telephone 20 in FIG. 1], press 2 to talk to 615-300-0124 [call 2, telephone 30 in FIG. 1]. The user then presses the 1 button 404 if they wish talk to mobile station 20 and presses the 2 button 406 if they wish to talk to the telephone 30. Obviously, the text in the prompt message 402 may vary and no particular format is particularly important. In the example of FIG. 7, after the user presses the 1 or 2 button, the phone 10 automatically sends a response message back to the mobile switching center which is received as indicated at step 124 in FIG. 4. The MSC 40 then proceeds to process the calls 1 and 2 depending on the data contained in the response message. For example, call 1 is sent to voice mail and call 2 is connected to mobile station 10 over the traffic channel.

Figure 8:
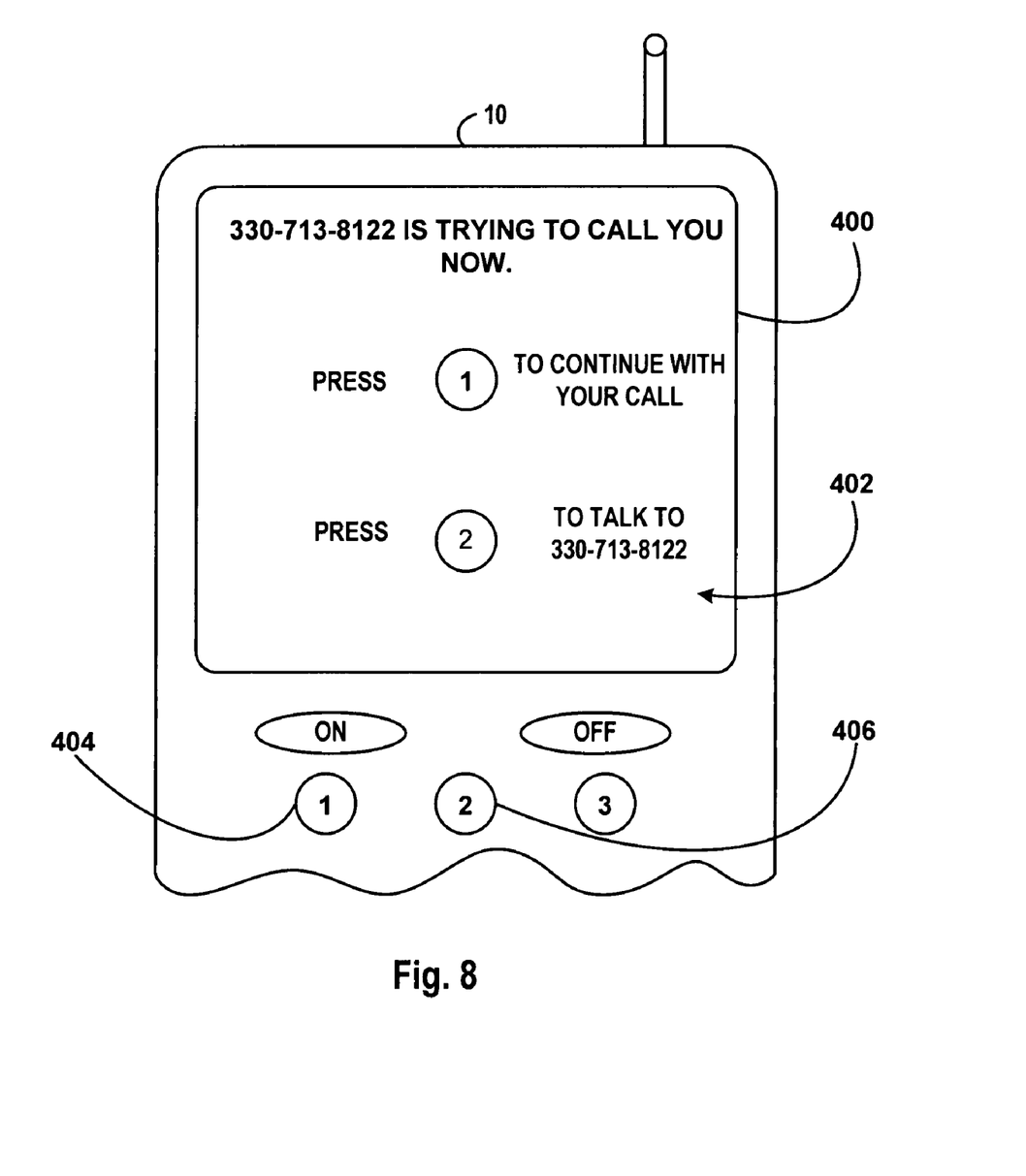
FIG. 8 is an illustration of a message displayed on a screen of the mobile station after it has received an alert message such as shown in FIG. 6 in the access state scenario, giving the user of the mobile station the option to accept abort the outgoing call that was being set up and accept the incoming call, or continue with the outgoing call and send the new incoming call to voice mail.

FIG. 8 is an illustration of a message 402 displayed on a screen 400 of the mobile station 10 after it has received an alert message 300 such as shown in FIG. 6 in the access state scenario (FIG. 2), giving the user of the mobile station the option to abort the outgoing call that was being set up and accept the new incoming call, or continue with the outgoing call and send the new incoming call to voice mail. For example the message 402 states "303-713-8122 [the phone number of telephone 20 in FIG. 2] is trying to call you now. Press 1 to continue with your call [to telephone 30 in FIG. 2]. Press 2 to talk to 303-713-8122." The user then presses the appropriate digit 404 or 406 depending on how they wish to handle the call from telephone 20 (FIG. 2).

In both FIG. 7 and FIG. 8, it will be appreciated that the user now has some control on how they handle calls that arrive while they are currently in the access or paging state. This invention as explained above thus represents an improvement over the prior art, in which case the incoming call would simply be sent to voice mail.

While a number of exemplary aspects and embodiments have been discussed above, those of skill in the art will recognize various modifications, permutations, additions and sub-combinations thereof as being present in the disclosure. It is therefore intended that the following appended claims and claims hereafter introduced are interpreted to include all such modifications, permutations, additions and sub-combinations as are within their true spirit and scope.

We claim:

1. A method comprising:

receiving into a wireless telephone network a request to connect a new call to a mobile station served by the network;

upon receipt of the request, the network detecting that the mobile station is currently in a first state selected from the group consisting of an access state and a paging state, wherein when the mobile station is in the first state, the network does not transmit to the mobile station a notification of the new call and a user of the mobile station therefore does not have an option to take the new call; and responsive to detecting that the mobile station is currently in the first state upon receipt of the request, the network waiting until the mobile station has transitioned out of the first state and into a traffic state and, once the mobile station has transitioned to the traffic state, the network then transmitting to the mobile station a notification of the new call, to facilitate providing the user of the mobile station with an option to take the new call.

2. The method of claim 1, further comprising:

the network receiving from the mobile station a response to the notification; and the network handling the new call in accordance with the received response.

3. The method of claim 2, wherein the response includes data representing how the network should handle the new call.

4. The method of claim 3, wherein the data represents a call handling directive entered into the mobile station by the user.

5. The method of claim 4, wherein the directive is to connect the new call to the mobile station.

6. The method of claim 2, wherein handling the new call in accordance with the received response comprises abandoning a call for which the mobile station was in the first state, and instead connecting the new call to the mobile station.

7. The method of claim 2, wherein handling the new call in accordance with the received response comprises sending the new call to voice mail.

8. The method of claim 1, wherein detecting that the mobile station is currently in the first state comprises referring to data that specifies the state of registered mobile stations, and determining from the data that the mobile station is currently in the first state.

9. The method of claim 1, wherein waiting until the mobile station has transitioned out of the first state and into a traffic state comprises setting a timer, waiting for the timer to expire, and upon expiration of the timer then determining whether the mobile station has transitioned to the traffic state.

10. In a mobile switching center, the improvement comprising:

memory storing state information specifying respectively for each mobile station of a plurality of mobile stations whether the mobile station is currently in a first state selected from the group consisting of an access state and a paging state;

instructions executable by a processing unit of the mobile switching center, upon receipt of a request to connect a new call to a given mobile station:

(a) to determine from the state information that the given mobile station is currently in the first state, wherein when the given mobile station is in the first state, the mobile switching center does not transmit to the given mobile station a notification of the new call and a user of the mobile station therefore does not have an option to take the new call, and (b) responsive to detecting that the mobile station is currently in the first state upon receipt of the request, to wait until the mobile station has transitioned out of the first state and into a traffic state and, once the mobile station has transitioned to the traffic state, to then transmit to the mobile station a notification of the new call so as to facilitate providing the user of the mobile station with an option to take the new call.

11. The improvement of claim 10, wherein the instructions are further executable to receive from the mobile station a response to the notification and to handle the new call in accordance with the received response.

12. The improvement of claim 11, wherein the response includes data representing a call handling directive entered into the mobile station by the user.

13. The improvement of claim 12, wherein, in accordance with the directive, the instructions are executable to abandon a call for which the mobile station was in the first state, and to instead connect the new call to the mobile station.

14. The improvement of claim 12, wherein, in accordance with the directive, the instructions are executable to send the new call to voice mail.

15. The improvement of claim 10, wherein the instructions are executable to wait until the mobile station has transitioned out of the first state and into a traffic state by applying a process comprising (i) setting a timer, (ii) waiting for the timer to expire, and (iii) upon expiration of the timer then determining whether the mobile station has transitioned to the traffic state.

16. A method of processing an incoming call for a mobile station, comprising the steps of:
 receiving an incoming call for the mobile station at a mobile switching center;
 checking the current state of the mobile station;
 in the event that the mobile station is in an access state or paging state, (a) waiting until the mobile station transitions to a traffic state, (b) after the mobile station transitions to a traffic state, sending an alert message to the mobile station informing the mobile station of the incoming call, (c) receiving a response to the alert message from the mobile station, and (d) handling the incoming call in accordance with the response,
 wherein waiting until the mobile station transitions to the traffic state comprises (i) setting a timer having a timer value, (ii) waiting for the timer value to elapse, (iii) re-checking the state of the mobile station, and proceeding with step (b) if the mobile station has transitioned to the traffic state but repeating steps (i), (ii), and (iii) if the mobile station has not transitioned to the traffic state.

17. The method of claim 16, wherein the timer value has a first value if the mobile station is in the paging state and the timer value has a second value if the mobile station is in the access state.

18. The method of claim 17, wherein the first and second timer values are 30 seconds or less.

19. In a mobile switching center, the improvement comprising:
 providing a memory maintaining state information as to whether mobile stations are currently in an access state or a paging state; and
 providing instructions in the mobile switching center whereby in the event that an incoming call for a mobile station occurs while the mobile station is in either the access state or a paging state the mobile switching center performs a waiting step and waits until the mobile station transitions to a traffic state, and thereafter the mobile switching center sends an alert message to the mobile station alerting the mobile station of the incoming call,
 wherein the waiting step comprises the steps of (i) setting a timer having a timer value, (ii) waiting for the timer value to elapse, (iii) re-checking the state of the mobile station, and proceeding to send the alert message if the mobile station has transitioned to the traffic state,
 wherein the timer value has a first value if the mobile station is in the paging state and the timer value has a second value if the mobile station is in the access state.

20. The improvement of claim 19, wherein the first and second timer values are 30 seconds or less.

* * * * *